United States Patent
Allen

(10) Patent No.: US 10,268,669 B1
(45) Date of Patent: Apr. 23, 2019

(54) INTELLIGENT GRAPHICAL WORD PROCESSING SYSTEM AND METHOD

(71) Applicant: John C. Allen, Monteagle, TN (US)

(72) Inventor: John C. Allen, Monteagle, TN (US)

( * ) Notice: Subject to any disclaimer, the term of this patent is extended or adjusted under 35 U.S.C. 154(b) by 0 days.

(21) Appl. No.: 15/880,653

(22) Filed: Jan. 26, 2018

Related U.S. Application Data

(60) Provisional application No. 62/451,088, filed on Jan. 27, 2017.

(51) Int. Cl.
| | |
|---|---|
| *G06F 17/00* | (2019.01) |
| *G06F 17/24* | (2006.01) |
| *G06F 3/0483* | (2013.01) |
| *G06F 3/0482* | (2013.01) |
| *G06F 17/21* | (2006.01) |
| *G06F 17/22* | (2006.01) |

(52) U.S. Cl.
CPC .......... *G06F 17/248* (2013.01); *G06F 3/0482* (2013.01); *G06F 3/0483* (2013.01); *G06F 17/212* (2013.01); *G06F 17/2229* (2013.01)

(58) Field of Classification Search
CPC .................................................. G06F 17/2229
See application file for complete search history.

(56) References Cited

U.S. PATENT DOCUMENTS

| | | | | |
|---|---|---|---|---|
| 5,341,293 A | * | 8/1994 | Vertelney | G06F 3/0481 715/236 |
| 6,233,583 B1 | * | 5/2001 | Hoth | G06F 17/30398 707/752 |
| 8,083,523 B2 | * | 12/2011 | De Ley | G09B 5/00 434/159 |
| 8,137,106 B2 | | 3/2012 | De Ley et al. | |
| 8,413,045 B2 | * | 4/2013 | Lemonik | G06F 17/2247 715/234 |
| 9,558,577 B2 | * | 1/2017 | Hobbs | G06T 11/60 |
| 9,946,434 B2 | * | 4/2018 | Santoro | G06F 3/0481 |
| 2002/0156774 A1 | * | 10/2002 | Beauregard | G06F 9/45512 |
| 2003/0046082 A1 | * | 3/2003 | Siegel | G06F 17/30017 704/270 |
| 2003/0177140 A1 | * | 9/2003 | Debard | G06F 8/34 |
| 2004/0126749 A1 | * | 7/2004 | Honma | G09B 7/00 434/362 |

(Continued)

FOREIGN PATENT DOCUMENTS

| | | |
|---|---|---|
| WO | WO2006029458 | 3/2006 |

*Primary Examiner* — Laurie A Ries
(74) *Attorney, Agent, or Firm* — Matthew M. Googe; Robinson IP Law, PLLC

(57) ABSTRACT

A graphical word processing system includes: a computing device including a display and a user input device; a user-facing application operable to be displayed on the computing device, the user-facing application including a text editing area for receiving textual user input from the user input device, the text editing area including at least a first tab and a second tab and a selectable shortcut button displayed on the computing device and selectable by the user; an artificial intelligence module for interpreting the textual user input of the first tab, retrieving content from a network based on the textual user input and a browsing history of the user on the computing device, and for displaying content based on the textual user input and retrieved content on the second tab of the user-facing application.

9 Claims, 27 Drawing Sheets

(56) References Cited

U.S. PATENT DOCUMENTS

| | | | |
|---|---|---|---|
| 2005/0032027 A1* | 2/2005 | Patton | G09B 17/00 |
| | | | 434/170 |
| 2007/0156747 A1* | 7/2007 | Samuelson | G06F 17/30873 |
| 2007/0174041 A1* | 7/2007 | Yeske | G06F 17/2785 |
| | | | 704/3 |
| 2009/0222551 A1* | 9/2009 | Neely | G06F 17/30864 |
| | | | 709/224 |
| 2011/0153324 A1* | 6/2011 | Ballinger | G10L 15/30 |
| | | | 704/235 |
| 2012/0254713 A1* | 10/2012 | Roth | G06F 17/218 |
| | | | 715/209 |
| 2014/0136190 A1* | 5/2014 | Lowles | G06F 1/1626 |
| | | | 704/10 |
| 2014/0237359 A1* | 8/2014 | Privault | G06F 3/04883 |
| | | | 715/273 |
| 2014/0274254 A1* | 9/2014 | Leites | G06F 3/0483 |
| | | | 463/11 |
| 2014/0323225 A1* | 10/2014 | Agrawal | A63F 13/795 |
| | | | 463/42 |
| 2017/0256027 A1* | 9/2017 | Saeed | G06T 1/20 |
| 2017/0263248 A1* | 9/2017 | Gruber | G10L 15/22 |

\* cited by examiner

*msg#1 - "Error! No text to rewrite."

*msg#2 - "No websites found. Do you want to Rewrite what you have written?" This will have Yes and No buttons.

*msg#3 - "Rewrite process is complete!"

R1  A  mouse  chases  a  cat  The

R2  cat  is  chasing  a  ferret,  dog.

R3  while  the ferret is chasing  a  What

R4  a strange  sight.

R5

Trash Button

Base Tile

Tile with Trash Button*

* Trash Button will be located on the right, like pictured above.

| R1 | WHO |
| R2 | |
| R3 | cat is chasing a ferret, dog. |
| R4 | while the ferret is chasing a |
| R5 | |
| R6 | WHAT |
| R7 | |
| R8 | What a strange sight. |
| R9 | |
| R10 | WHEN |
| R11 | |
| R12 | A mouse chases |
| R13 | a cat The |

*FIG. 37*

INTELLIGENT GRAPHICAL WORD PROCESSING SYSTEM AND METHOD

CROSS-REFERENCE TO RELATED APPLICATION

This application claims priority to U.S. provisional patent application Ser. No. 62/451,088 for an "Intelligent Graphical Word Processing System and Method" filed on Jan. 27, 2017, the contents of which are incorporated by reference herein in its entirety.

FIELD

This disclosure relates to the field of graphical word processors. More particularly, this disclosure relates to a system and method for intelligent assembling of text documents and a graphical user interface for assembling a text document.

BACKGROUND

Conventional word processors, such as Microsoft Word®, allow the creation and formatting of electronic written documents. During a typical process of creating an electronic textual document, a user may initially outline or brainstorm ideas into an electronic document, and then develop the initial outline or brainstorm ideas into a full written document. This requires a user to fill in and complete sections of the document based on the earlier-entered outline or brainstorm ideas.

When a user later desires to edit the document, such as by rearranging an order of portions of the document, the user must move sections of content within the document and ensure that the accompanying portions of text added by the user are also moved.

What is needed, therefore, is an intelligent graphical word processing system and method that allows a user to readily construct and organize data within an electronic written document.

SUMMARY

The above and other needs are met by an intelligent word processing system and method that allows a user to readily construct and organize data within an electronic written document. In a first aspect, a graphical word processing system includes: a computing device including a display and a user input device; a user-facing application operable to be displayed on the computing device, the user-facing application including a text editing area for receiving textual user input from the user input device, the text editing area including at least a first tab and a second tab and one or more selectable shortcut buttons displayed on the computing device and selectable by the user; an artificial intelligence module for interpreting the textual user input of the first tab, retrieving content from a network based on the textual user input and a browsing history of the user on the computing device, and for displaying content based on the textual user input and retrieved content on the second tab of the user-facing application; and a tile module for displaying textual input received in the text editing area of the user-facing application as movable word tiles.

In one embodiment, the text editing area further including a third tab. The artificial intelligence module displays hyperlinks corresponding to content retrieved by the artificial intelligence module in the third tab.

In another embodiment, the user-facing application further including a Category Organizer including a category area displaying one or more categories selectable by the user, wherein the movable tiles may be dropped into one or more categories of the Organizer Area by the user.

In yet another embodiment, each of the movable tiles corresponding to words received in the text editing area includes a selectable trash portion, wherein selection of the trash portion moves the movable tile to a trash portion of the user-facing application.

In one embodiment, the tile module converts each word within the text editing area into separate movable tiles displayed on the user-facing application.

In another embodiment, the tile module aggregates a plurality of separate movable tiles into individual tiles having multiple words on the tiles based on user selection of the movable tiles on the user-facing application.

In yet another embodiment, the graphical word processing system further includes a trash portion for receiving discarded text.

In a second aspect, a graphical word processing system includes: a computing device including a display and a user input device; a user-facing application operable to be displayed on the computing device, the user-facing application including a text editing area for receiving textual user input from the user input device, the text editing area including at least a first tab and a second tab and a selectable shortcut button displayed on the computing device and selectable by the user; an artificial intelligence module for interpreting the textual user input of the first tab, retrieving content from a network based on the textual user input and a browsing history of the user on the computing device, and for displaying content based on the textual user input and retrieved content on the second tab of the user-facing application; and a tile module for displaying textual input received in the text editing area of the user-facing application as movable word tiles.

In one embodiment, the tile module aggregates a plurality of separate movable tiles into individual tiles having multiple words on the tiles based on user selection of the movable tiles on the user-facing application.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 37 and 38 show tiles in a Category Organizer according to one embodiment of the present disclosure.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

An intelligent graphical word processing system and method is provided for constructing an electronic written document based on initial outline and notes inputted by a user. The system and method of the present disclosure receives words from user input and displays the words on a display of a computer, wherein the user may manipulate and otherwise compile an electronic written document using a graphical user interface shown on the display. The intelligent graphical word processing system and method enables a user to organize and arrange an electronic text document using a tile user interface such that the user may manipulate individual words or groups of words through a graphical input, such as a touchscreen or mouse. Further, the intelligent graphical word processing system and method assists a user in drafting an electronic text document by utilizing an AI system, which analyzes text inputted by the user and builds content in the text document by using information the AI system retrieved over the Internet, as described in greater detail below.

The intelligent graphical word processing system and method of the present disclosure is implemented on a computer system. The computer system may be formed of any type of known computer device, such as a personal computer, tablet, workstation, laptop, smartphone, or other like devices. The computer system includes a processor in communication with a computer readable storage medium, a display, one or more input devices (such as a mouse, keyboard, touchscreen, microphone, etc.), and a communications component for transmitting and receiving data over a network.

Embodiments of the graphical word processing system of the present disclosure are implemented as software code and instructions stored on memory of the computer system or on a removable disk. The computer accesses software stored on the memory or removable disk to execute the software code and instructions to perform functions of the intelligent graphical word processing system disclosed herein.

The intelligent graphical word processing system and method is operable in multiple modes including an Editor Mode and a ShuffleZ Mode. The Editor Mode allows a user to type and format a document, while the ShuffleZ Mode allows the user to visually rearrange text in response to receiving input from the user on the computer system.

Editor Mode

Figure 1:
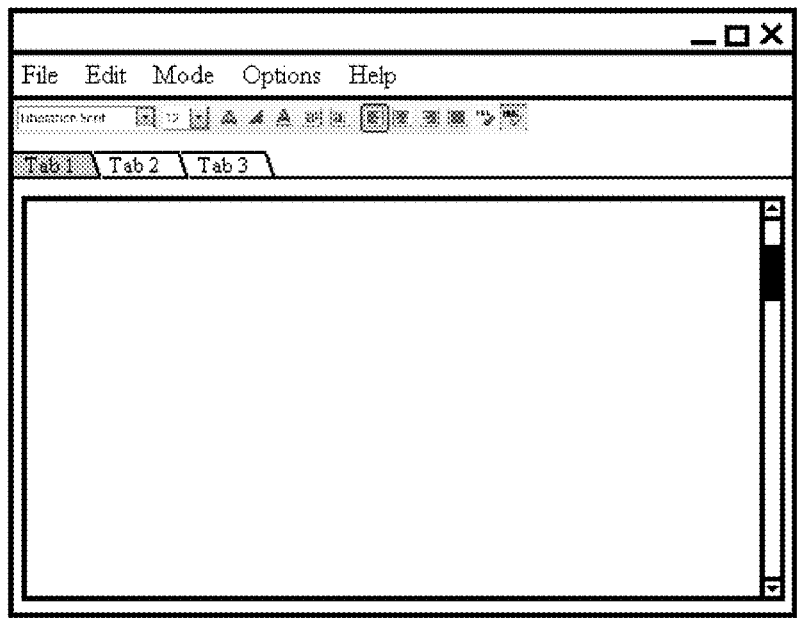
FIGS. 1 and 2 illustrate an Editor Mode of an intelligent graphical word processing system according to one embodiment of the present disclosure.

As shown in FIG. 1, Editor Mode includes a text editing component, which allows the user to type and format simple text documents. Editor Mode is comprised of multiple components: Text Editor, Trash Can, ScratchPad, and Category Organizer.

Figure 2:
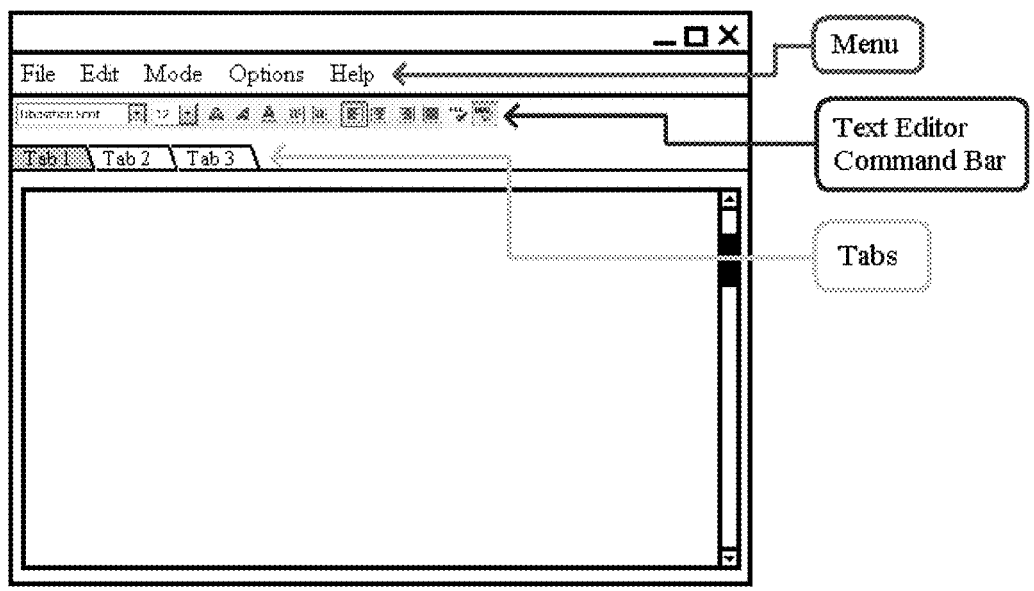

The Text Editor, illustrated in FIG. 2, includes a menu and a Text Editor Command Bar. The Text Editor includes three tabs, with each tab having a different purpose. The First Tab is the Text Editing Area. The Second Tab contains rewritten text compiled by an artificial intelligence component (AI or an artificial intelligence system) as described in greater detail below. The Third Tab displays hyperlinks to websites and other sources located by the AI component.

The Text Editor Command Bar includes shortcuts that allow the user to quickly access various formatting capabilities of text inputted by the user and displayed. The Text Editor Command Bar will, also, contain a shortcut button that, if selected by the user, will instruct the AI component to create a document and display it into the Second Tab as well as retrieve hyperlinks and display them in the Third Tab. The First Tab includes an area in which the user can type in an unlimited amount of text. The area will have a vertical scroll bar, and text in this area can be formatted using the shortcuts found in the Text Editor Command Bar. The Second Tab includes a scrollable area in which the AI component enters and displays text generated by the AI component. The user may freely modify the text within the Second Tab. The text in this area can be formatted using the shortcuts found in the Text Editor Command Bar. The Third Tab includes a scrollable area, which displays retrieved hyperlinks and website names gathered by the AI component. The Third Tab may also contain hyperlinks for advertisements, as described in greater detail below. When the user clicks on a hyperlink inside of this Tab, it will open that link inside of a default internet browser of the computer system.

The AI component may be used to create a readable and coherent text document, which will be displayed in the Second Tab. This text document will be based upon at least two inputs: web searches and what the user typed into the First Tab. First, the AI System will use the typed text from the First Tab to do web searches for more content. (These web searches will be based upon browser cookies and the typed text from the First Tab.)

Figure 3:
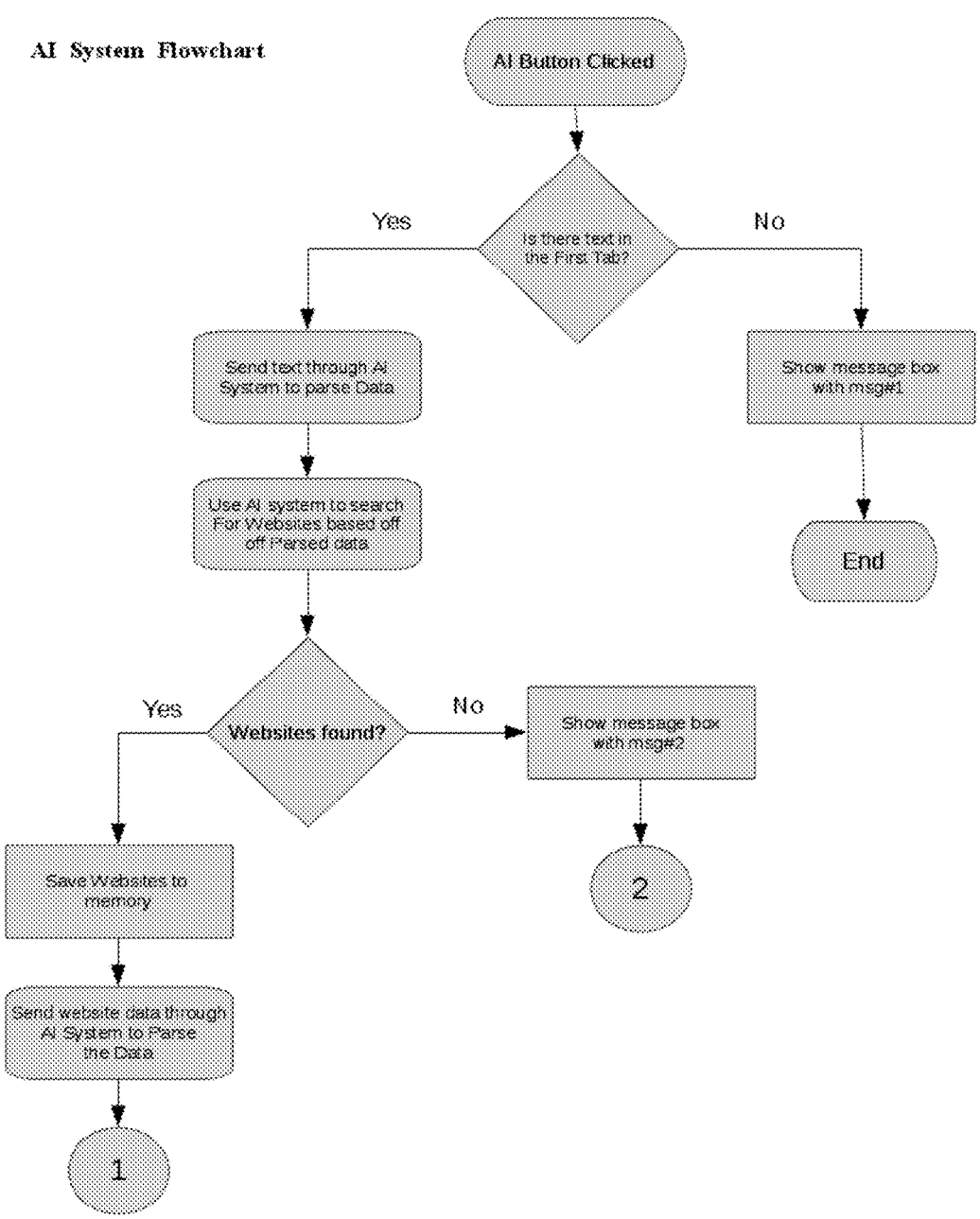
FIGS. 3 and 4 show a flowchart of an AI system of an intelligent graphical word processing system according to one embodiment of the present disclosure.
Figure 4:
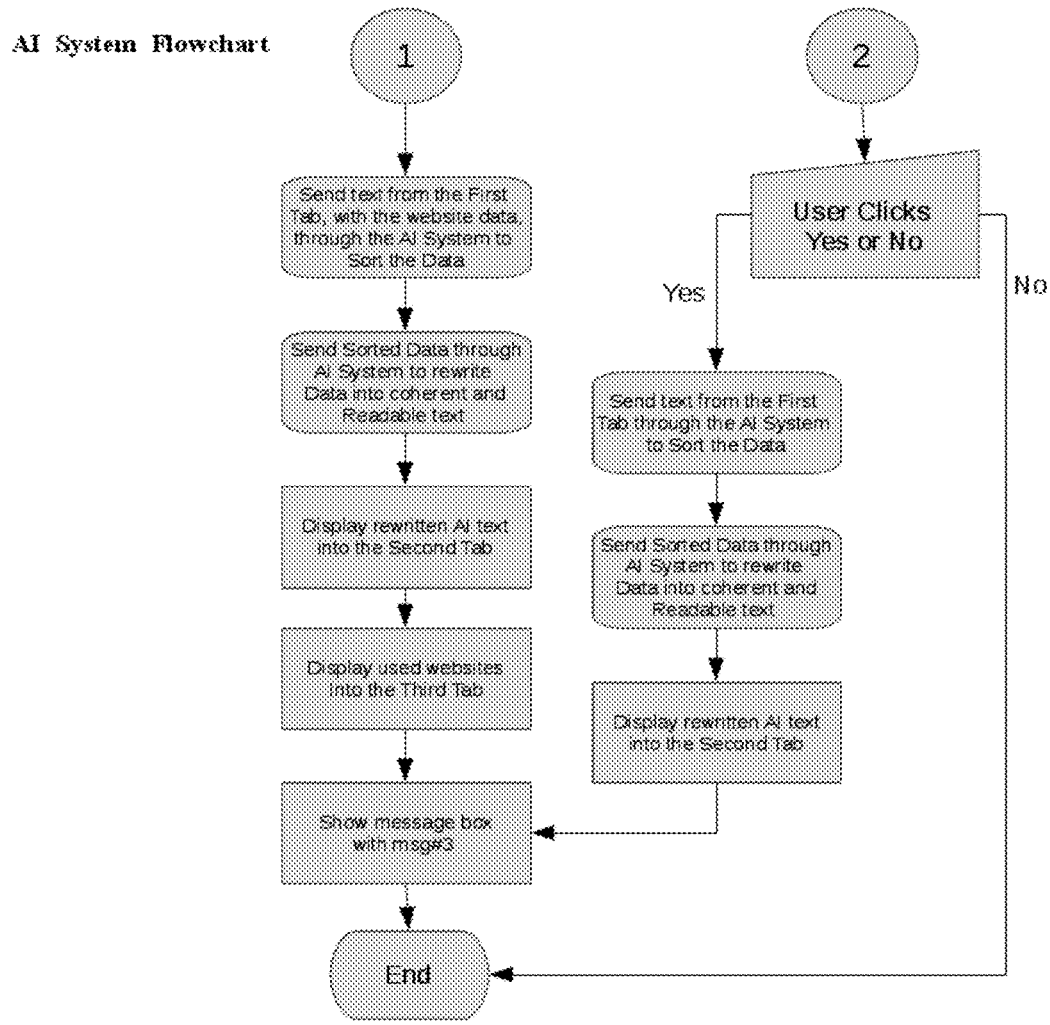

The AI component will scan through web pages, which were obtained through the web searches, to gather information pertaining to the typed text in the First Tab. The AI component will combine text from the First Tab and information gathered from the web pages. The AI component will then reorganize that text into a readable and coherent document, which will be displayed in the Second Tab. Text gathered from the websites will be formatted using the in-text attribution citation, with the referenced website links at the bottom of the text. The AI component will display the hyperlinks and website names it used for the information gathering, inside of the Third Tab. Illustrative flowcharts of the AI component of the present disclosure are shown in FIGS. 3 and 4.

As referred to herein, artificial intelligence (AI) refers to a computer system and accompanying software that allows the computer system to perform tasks that normally require at least some level of human intelligence, such as text recognition and visual perception. In the present disclosure, artificial intelligence may be used to recognize text terms inputted by a user, retrieve information related to those terms from the Internet, and construct sentences or other text structures based on the original text and information retrieved from the Internet.

Figure 5:
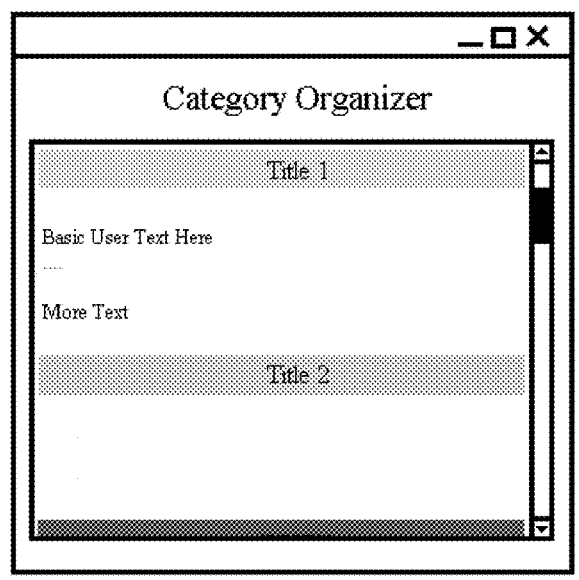
FIG. 5 shows a Category Organizer of an intelligent graphical word processing system according to one embodiment of the present disclosure.
Figure 6:
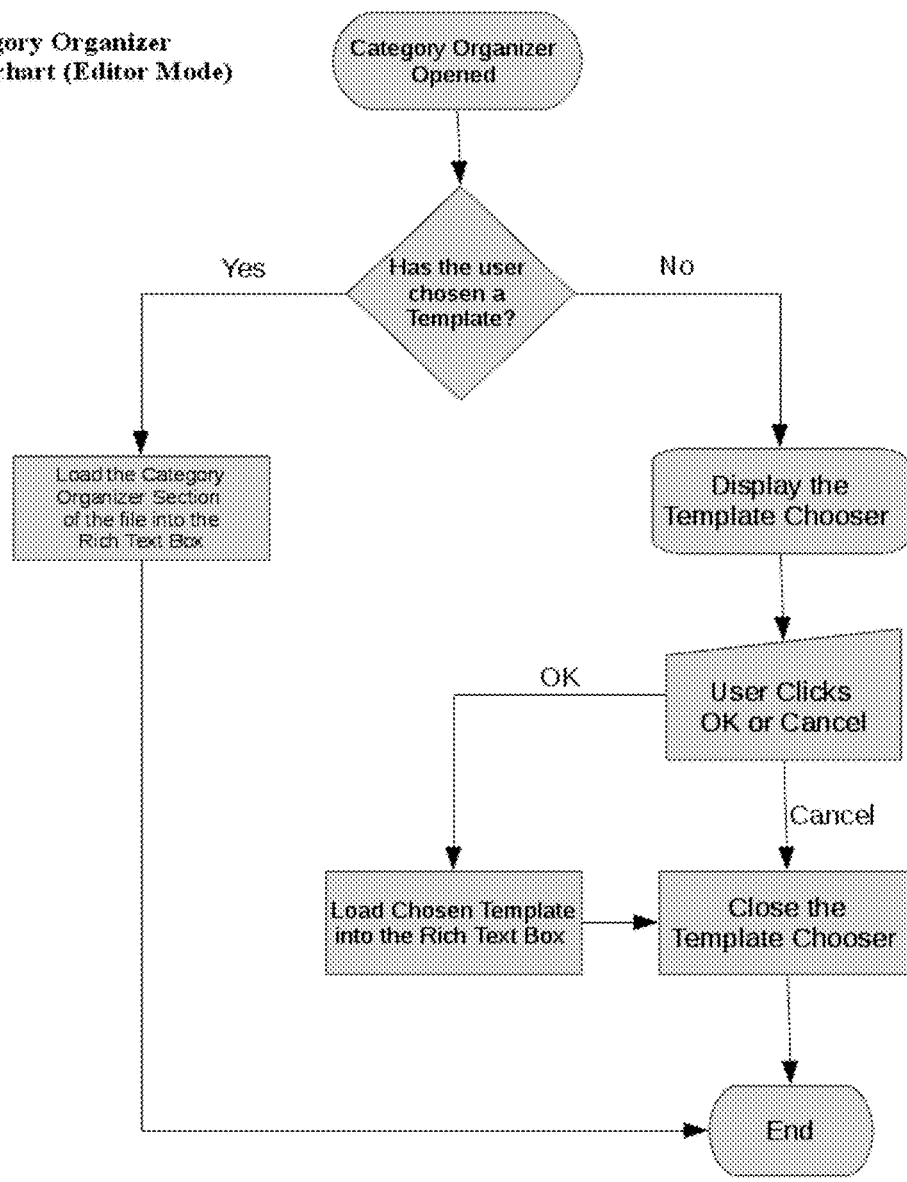
FIG. 6 shows a flowchart of a Category Organizer of an intelligent graphical word processing system according to one embodiment of the present disclosure.

Referring now to FIG. 5, a Category Organizer allows the user to organize text based off of a template system. Templates contain Titles and their background colors. The Category Organizer will display these Titles, with their background colors, to create a set of sections, which are easily distinguishable for the user. The user may type any text into these sections. FIG. 5 shows a basic example of how the Category Organizer could look. The Titles are in a larger font with a unique background that stretches from one side of the Rich Text Box to the other. The user can type text in between the Titles. FIG. 6 shows an illustrative flowchart of user operation of the Category Organizer.

Figure 7:
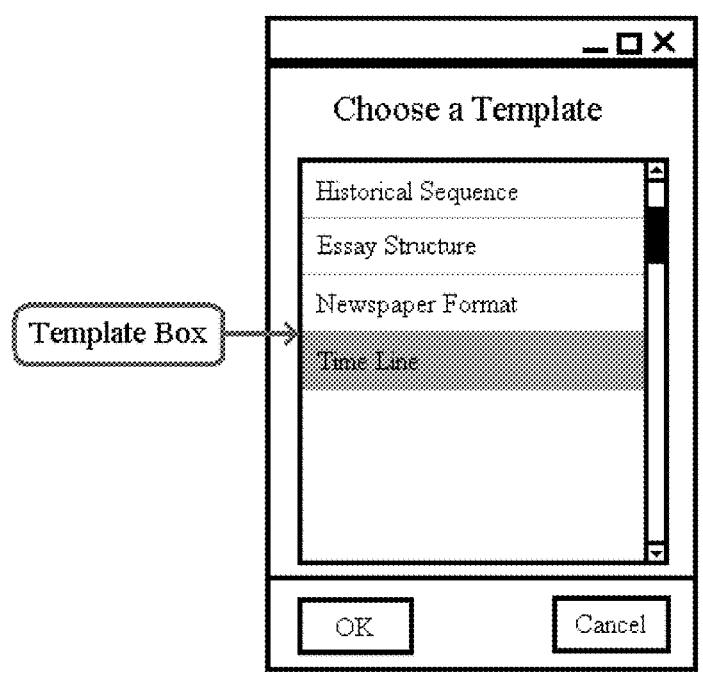
FIG. 7 shows a Template Chooser of an intelligent graphical word processing system according to one embodiment of the present disclosure.
Figure 8:
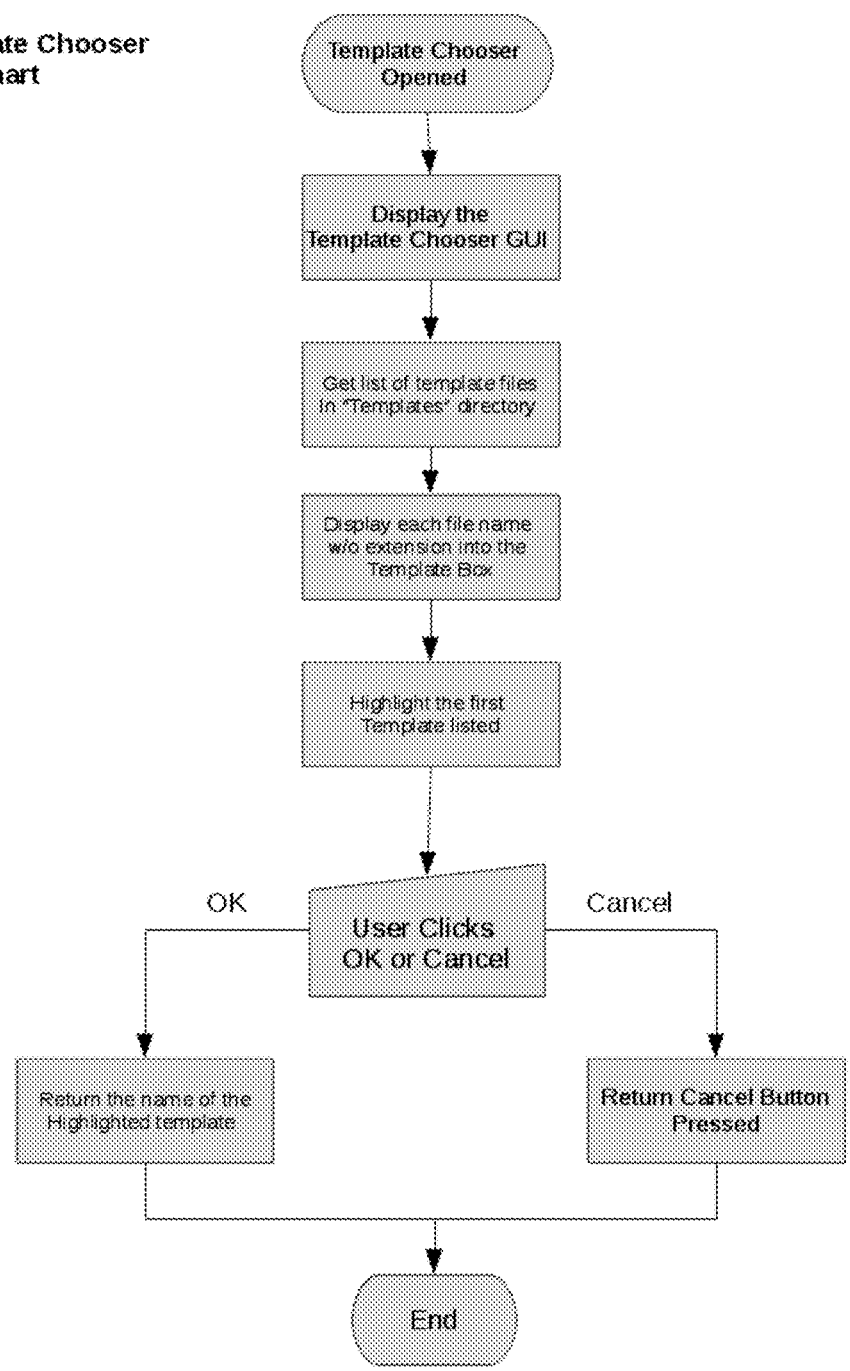
FIG. 8 shows a flowchart of a Template Chooser of an intelligent graphical word processing system according to one embodiment of the present disclosure.
Figure 9:
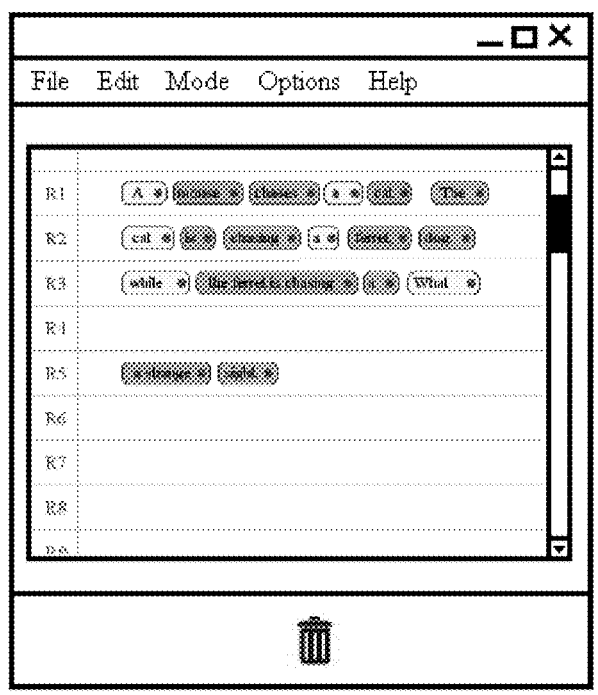
FIGS. 9 and 10 show a ReOrganizer of an intelligent graphical word processing system according to one embodiment of the present disclosure.

A Template Chooser, illustrated in FIG. 7, allows the user to select a Template for the Category Organizer. A layout of the Template Chooser will be similar to that of FIG. 7. When the Template Chooser loads, the following will happen: (1) a list of template files from a templates directory is retrieved and (2) each file name, without its extension, is displayed in a template box of the Template Chooser. Templates inside of the Template Box will highlight when selected by the user. When a Cancel Button is selected, return that the Cancel Button was clicked. When an OK Button is clicked, return the Template Name highlighted in the Template Box. A flowchart of the Template Chooser component is shown in FIG. 8.

ShuffleZ Mode

ShuffleZ Mode provides an interface (FIG. 18) that allows the user to readily reorganize text within an electronic text document and provide unique Drag and Drop capabilities. ShuffleZ Mode includes multiple components: ReOrganizer, ScratchPad, Trash Can, and Category Organizer.

Figures 18, 19:
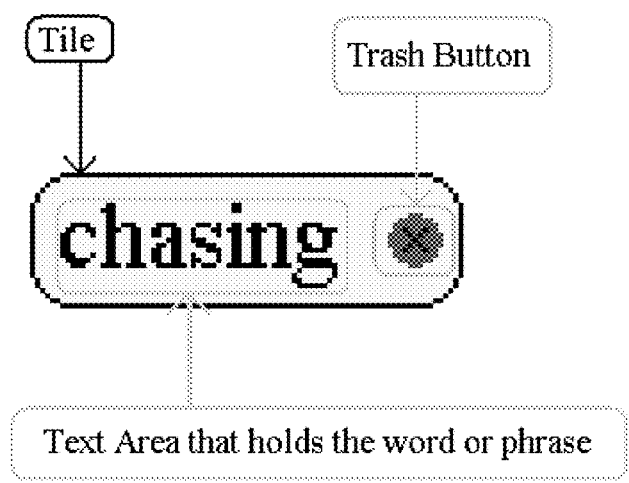
FIG. 18 shows a ShuffleZ Mode of an intelligent graphical word processing system according to one embodiment of the present disclosure.
FIGS. 19-21 show ShuffleZ Mode Tiles of an intelligent graphical word processing system according to one embodiment of the present disclosure.

The ShuffleZ Mode interface includes Tiles and Rows, as shown in FIG. 18. The ShuffleZ Mode interface also includes multiple settings, which the user can change or define. These settings are as follows: Tile Color Pattern, Tile Font, and Shortcuts. These settings are stored in an external .ini file named "settings.ini."

Figure 11:
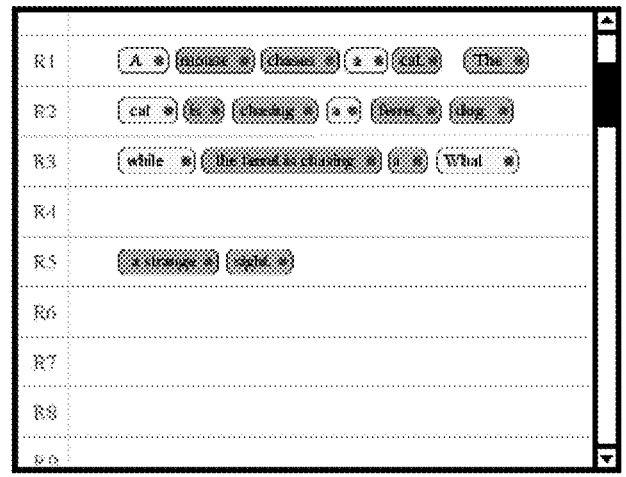
FIG. 11 shows an Organizer Area of an intelligent graphical word processing system according to one embodiment of the present disclosure.

The Organizer Area will be a scrollable box that will include a tile interface, as discussed in greater detail herein. The Organizer Area also includes rows, labeled as "R1" to "R9" in FIG. 11. The Organizer Area is accessible in each of the components of the ShuffleZ Mode interface. A manipulating ability of the tiles and rows of the Organizer Area will be consistent throughout the ShuffleZ Mode interface.

Figure 10:
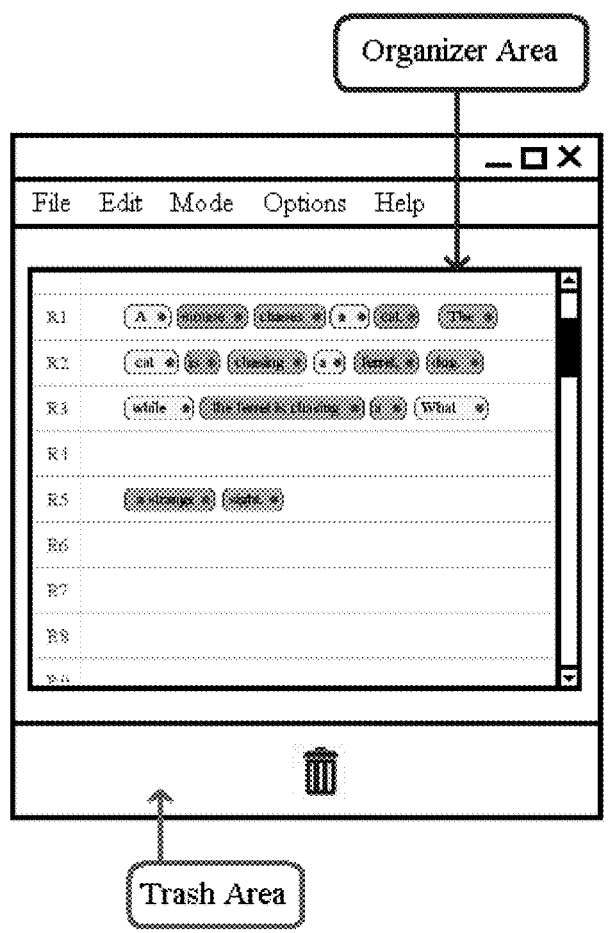
Figure 12:
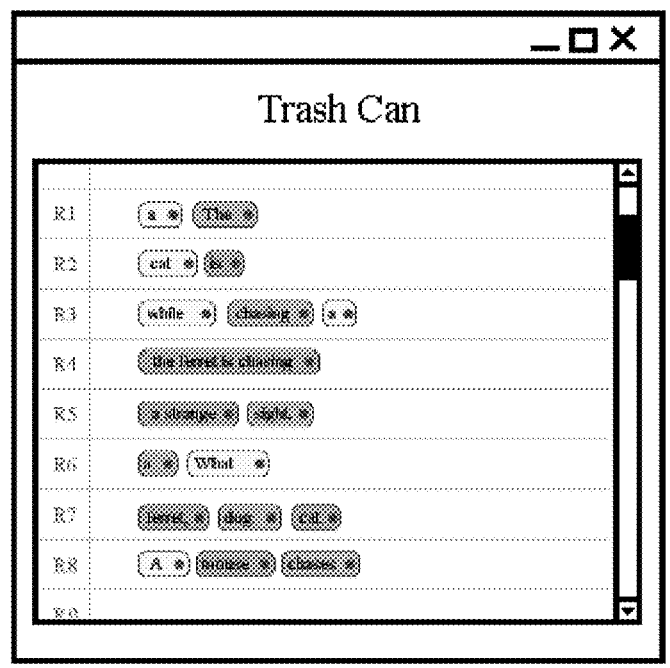
FIG. 12 shows a Trash Can of an intelligent graphical word processing system according to one embodiment of the present disclosure.

The Trash Area, as shown in FIG. 10, is a place where the user can Drag and Drop the tiles from the Organizer Area. If a tile is dropped into the Trash Area, then the tile will be removed from the Organizer Area and added to the Trash Can. The Trash Can includes an Organizer Area that functions in the same manner as the Organizer Area described above. Each time a user sends tiles to the Trash Can, a new row will be added to the Trash Can Organizer Area with those tiles, as shown in FIG. 12.

Figure 13:
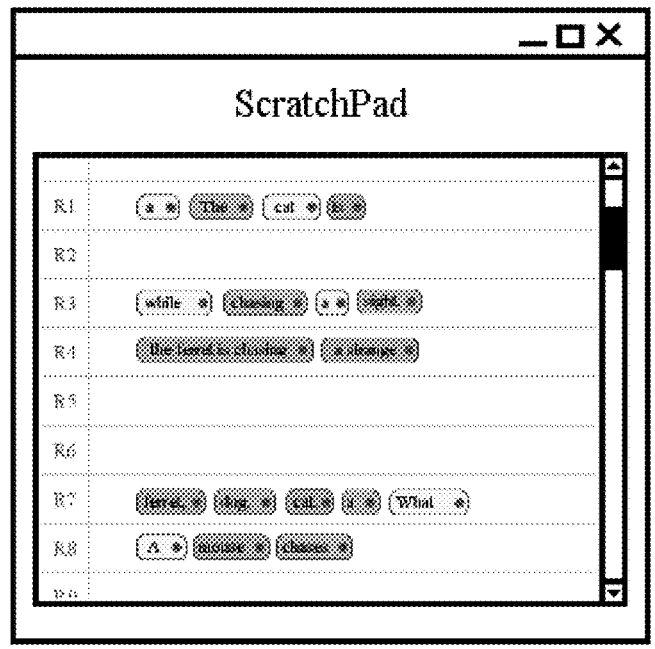
FIG. 13 shows a ScratchPad of an intelligent graphical word processing system according to one embodiment of the present disclosure.

The ScratchPad (FIG. 13) includes an Organizer Area. Each time a user sends tiles to the ScratchPad, a new row will be added with those tiles. The user may Drag and Drop tiles into any Row of the ScratchPad desired.

Figure 14:
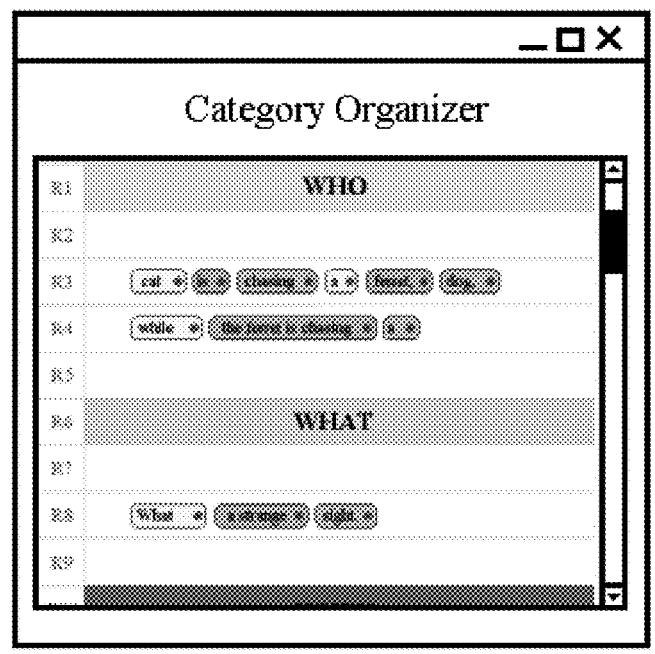
FIG. 14 shows a Category Organizer of an intelligent graphical word processing system according to one embodiment of the present disclosure.

The Category Organizer includes an Organizer Area. The Organizer Area inside the Category Organizer includes Title Rows, as shown in FIG. 14.

Figure 38:
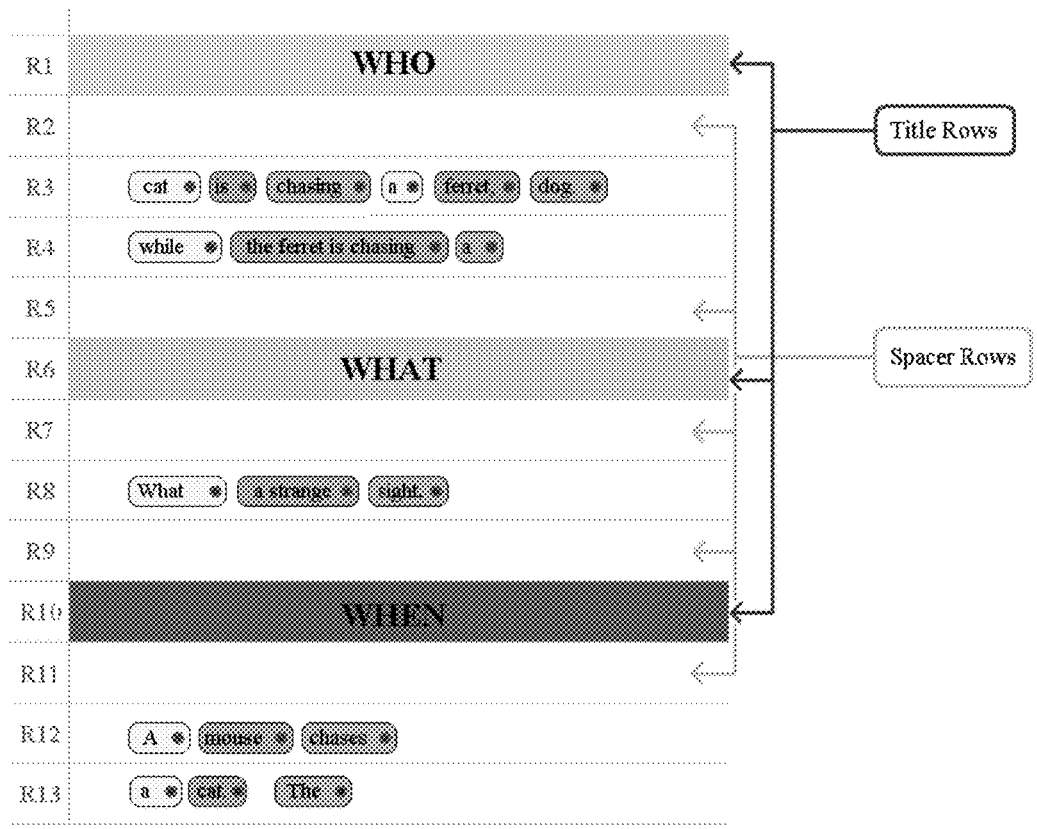

The Title Rows are the colored rows. In FIG. 14, the Title Rows have the colors of: light blue, green, and red. Each of the Title Rows will be in full uppercase lettering. The Title Rows will always display a background color. The user can choose and modify these background colors. The Title Rows have a Spacer Row above them and below them, except for the first Title Row, which only has a Spacer Row below it, as shown in FIG. 38.

The user may Drag and Drop tiles into any Row of the Category Organizer they wish, except for the Title Rows and the Spacer Rows, which are above and below the Title Rows. The Title Rows and Spacer Rows cannot have tiles dropped into them.

Figure 15:
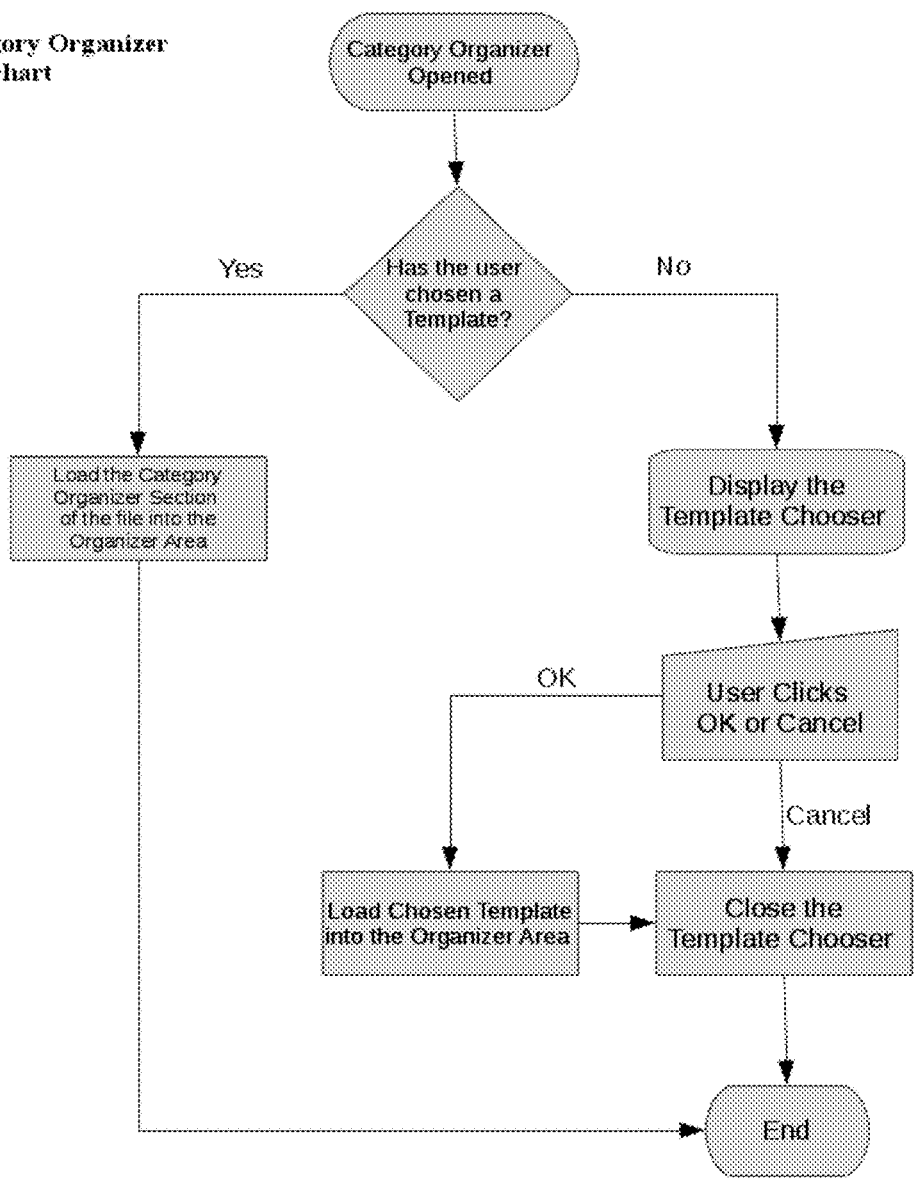
FIG. 15 shows a flowchart of a Category Organizer according to one embodiment of the present disclosure.

When the Category Organizer is accessed by the user, the intelligent graphical word processing system will check to see if the user has selected a template. If not, the Template Chooser will be displayed on the computer system to the user. If a template has been selected, the system will load the template into the Category Organizer component. The user may thereafter place content into the Organizer Area with the titles correctly colored and positioned. A flowchart illustrating the Category Organizer is shown in FIG. 15.

Figure 16:
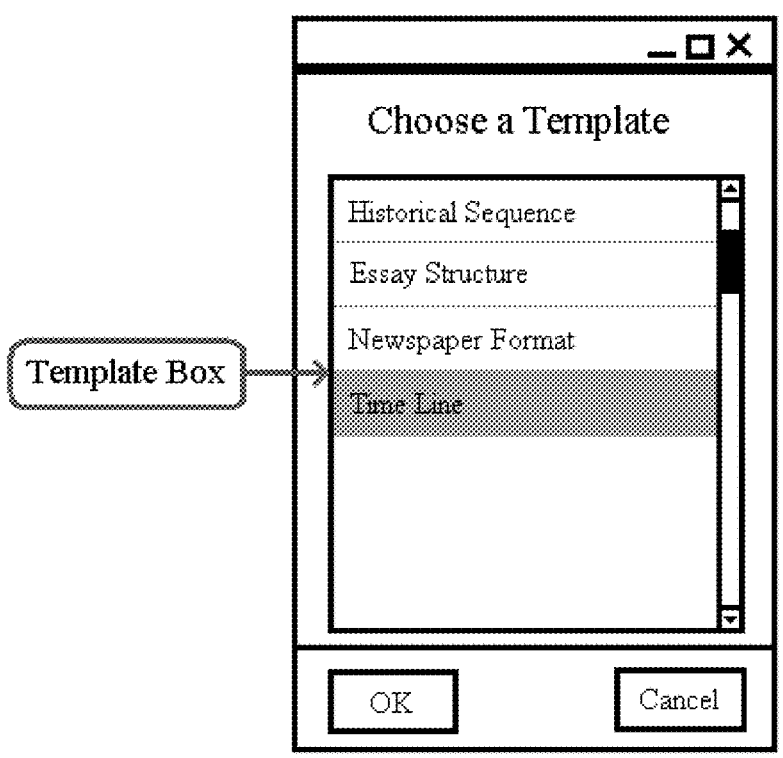
FIG. 16 shows a Template Chooser of an intelligent graphical word processing system according to one embodiment of the present disclosure.
Figure 17:
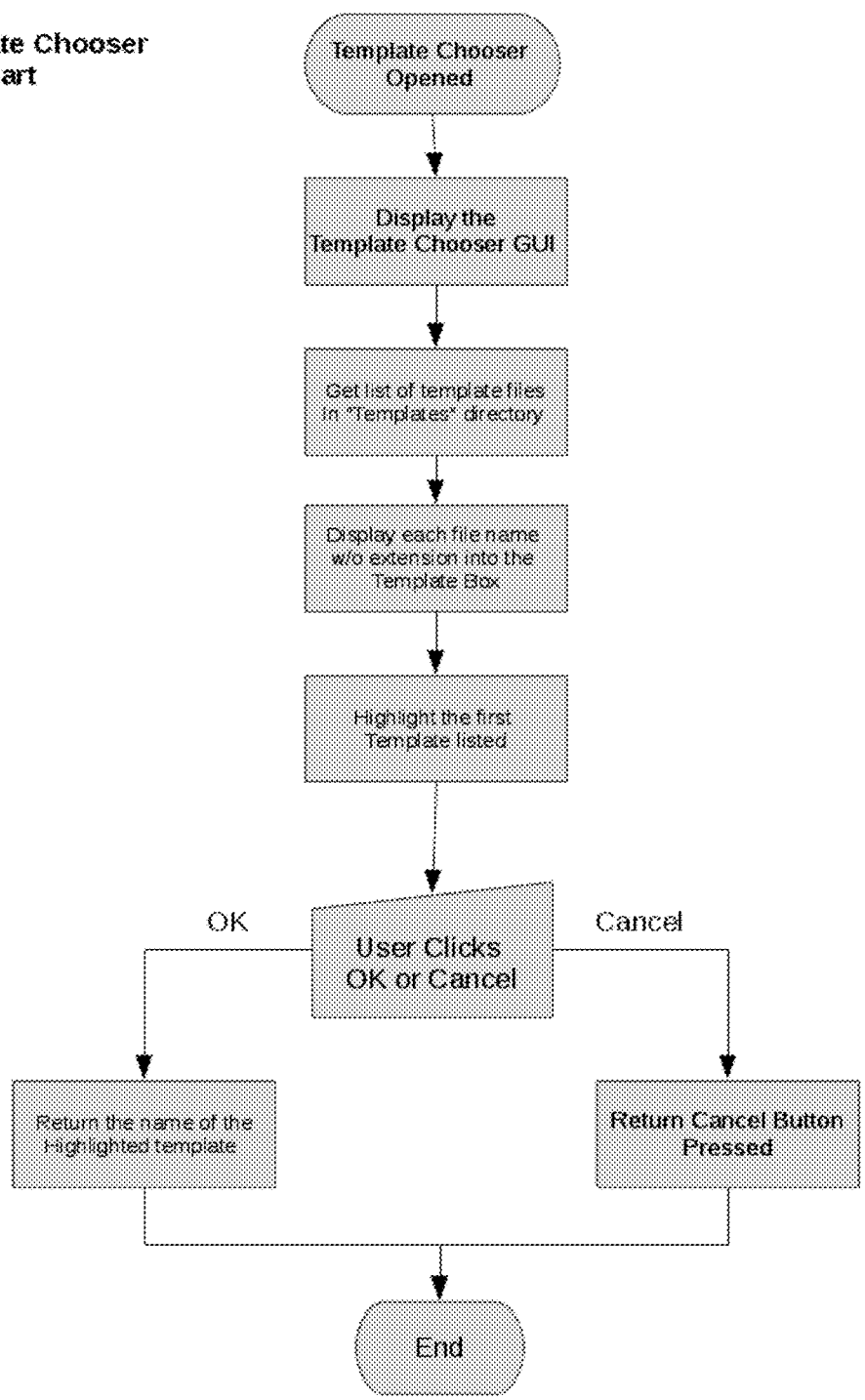
FIG. 17 shows a Template Chooser flowchart of an intelligent graphical word processing system according to one embodiment of the present disclosure.

The Template Chooser allows a user to select a Template for the Category Organizer. The layout of the Template Chooser, will be similar to that of FIG. 16. When the Template Chooser loads, the following will happen: (1) a list of template files are retrieved from a templates directory and (2) each file name is displayed, without its extension, in the Template Box of the Template Chooser. The templates inside of the Template Box will highlight when clicked upon by a user. When the Cancel Button is clicked, return that the Cancel Button was clicked. When the OK Button is clicked, return the Template Name highlighted in the Template Box. A flowchart of the Template Chooser is shown in FIG. 17.

One or more predefined template lists may be provided. The following are a set of predefined template lists for the Category Organizer. These lists will be in their own individual, external files. These files will be located in the "Templates" directory. They are in the order of:

```
<Template Name>
<TITLE 1>
<TITLE 2>
. . .
<TITLE n>
Essay Structure
PROPOSITION
DEVELOPMENT
CONCLUSION
Historical Sequence
DISTANT PAST
RECENT EVENTS
CURRENT ACTIVITY
IMPACT ON THE PRESENT
NEAR FUTURE PROBLEMS
LONG PERM PROBLEMS
Newspaper Format
WHO
WHAT
WHEN
WHERE
WHY
HOW
WRITERS THOUGHTS
LinkedIn Custom Resume Format
WHAT COMPANY
YOUR TITLE
DATES OF EMPLOYMENT
LOCATION
ACCOMPLISHMENTS
Priorities of Importance
MOST IMPORTANT
NEXT IMPORTANT
LEAST IMPORTANT
MISCELLANEOUS
Scientific Method
HYPOTHESIS
OBSERVATION DATA
DESIGN of HYPOTHESIS TEST
HYPOTHESIS TEST
TEST RESULTS
CONCLUSION
FUTURE QUESTIONS
Time Line
1985
1990
1995
2000
2005
2010
2015
```

Referring to FIG. 10, the ReOrganizer allows the user to reorganize their written text through a tile interface. The ReOrganizer includes three different sections: Menu, Organizer Area, and the Trash Area.

When the user enters into ShuffleZ Mode, all of the text inside the First Tab of the Text Editor is converted to "Tiles" that the user can move around, merge together, split, or delete, as explained in greater detail below.

Figure 20:
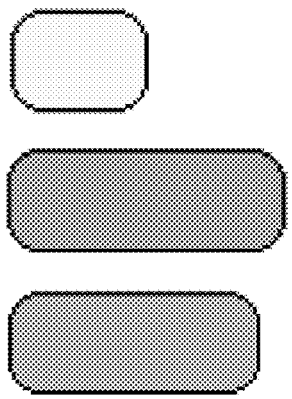

ShuffleZ Mode tiles (FIG. 19) include at least three separate parts: (1) the tile itself; the trash button; and the text area. A base tile (FIG. 20) includes a black border with a solid color as the background. A height of each tile will depend on the font size and the padding of the Text Area. The colors of the tiles can be decided by the user. However, there will be a default color scheme set. The color scheme may include three colors. These colors will create a pattern within the tiles and that pattern will repeat.

Figure 21:
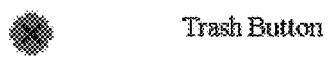
Figure 21:
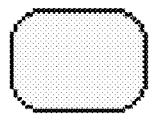
Figure 21:
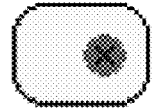

Referring to FIG. 21, the Trash Button will be located on the right side of each tile. When the Trash Button is clicked, the tile will be moved to the Trash Can. If the Trash Button is clicked, while inside of the Trash Can, then the tile, with the text, shall be deleted.

The Text Area will be located to the left of the Trash Button. The Text Area will have enough padding around it, so that the text will appear to be inside of the tile. The actual padding size will depend on what is the most visually appealing. The padding may need to change, based off of the font size.

Figure 22:
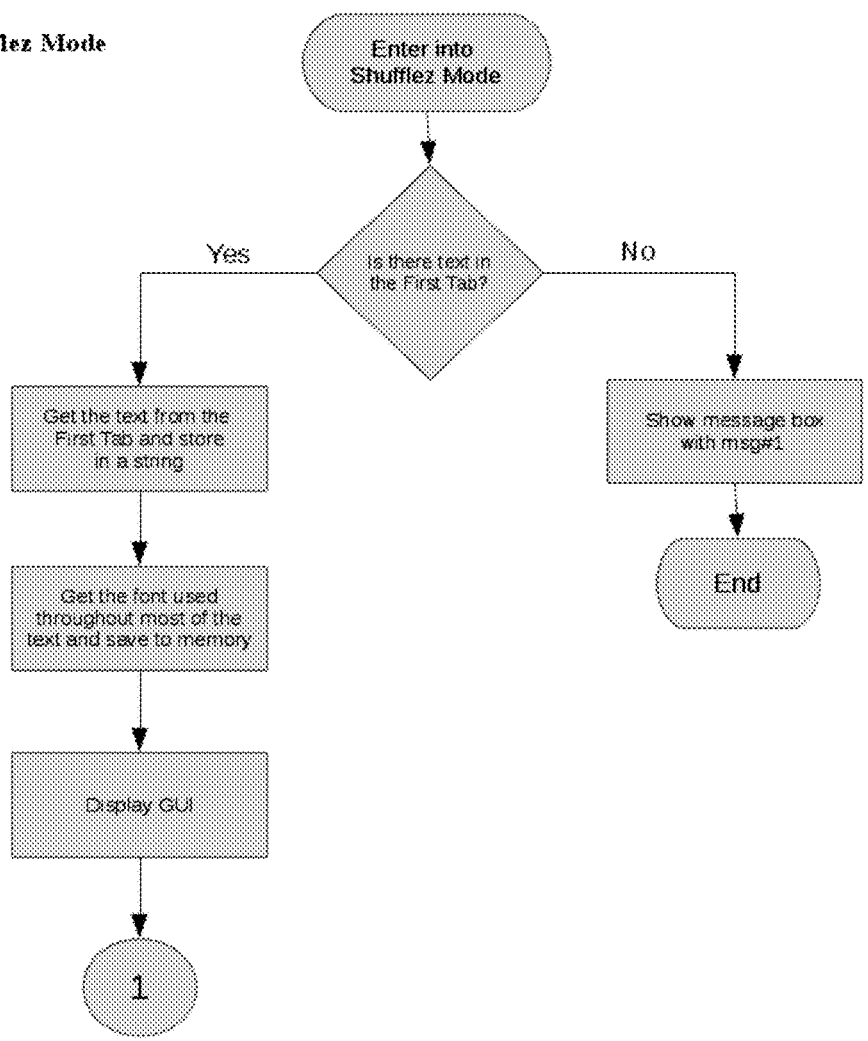
FIGS. 22 and 23 show flowcharts of Editor Mode to ShuffleZ Mode conversion of an intelligent graphical word processing system according to one embodiment of the present disclosure.
Figure 23:
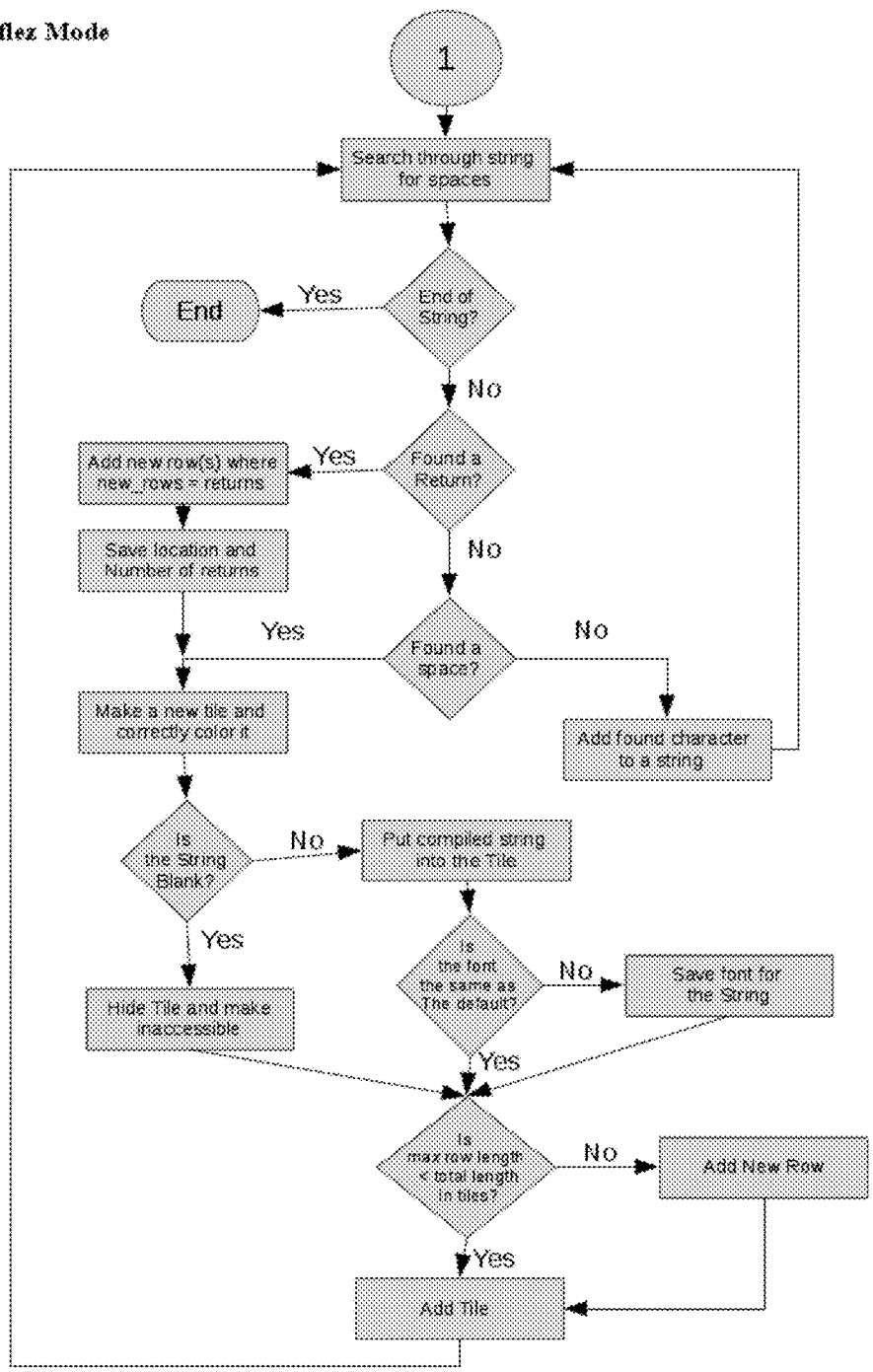
Figure 24:
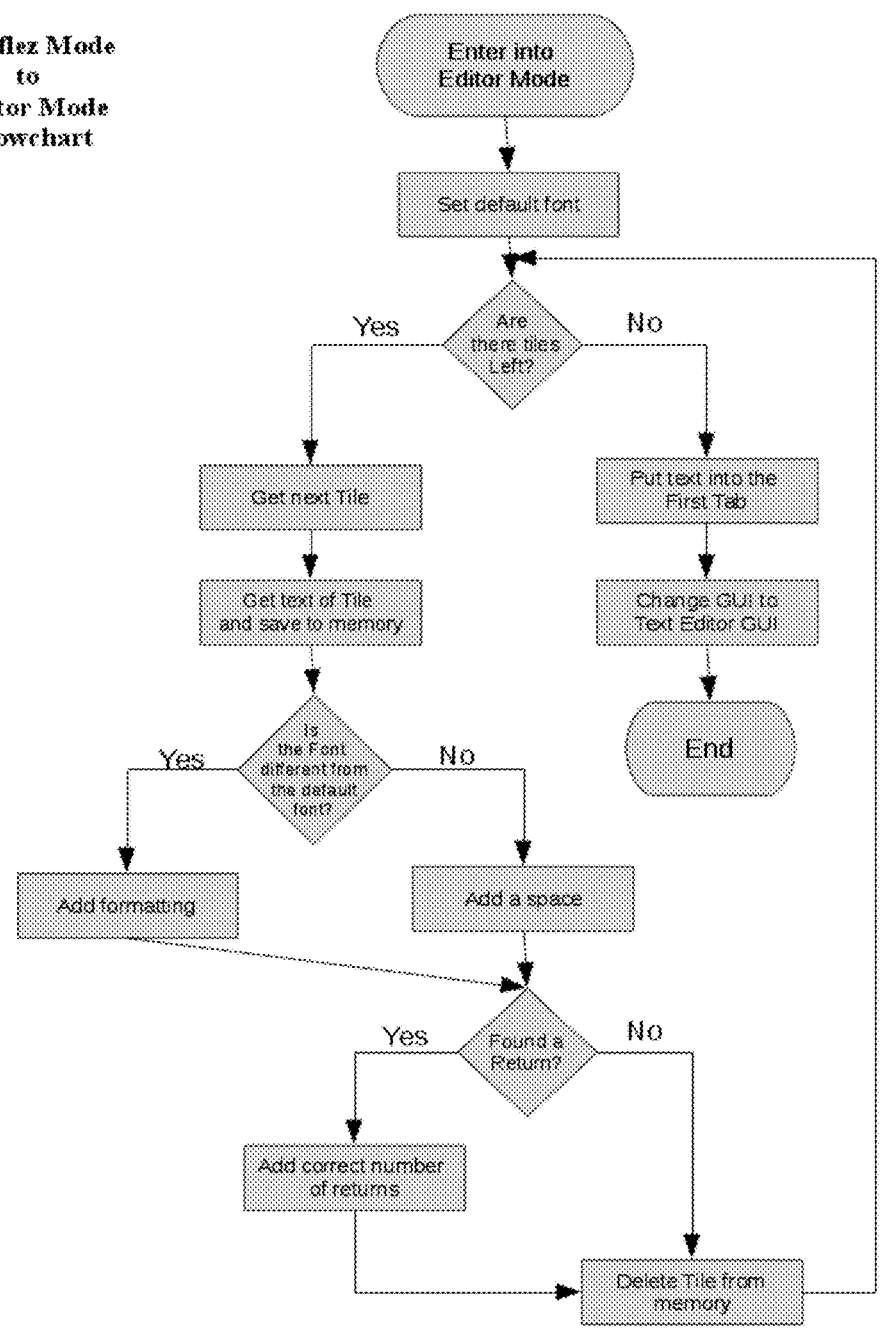
FIG. 24 shows a flowchart of a ShuffleZ Mode to Editor Mode conversion according to one embodiment of the present disclosure.

When a user first accesses the ShuffleZ Mode, a Tile Conversion Process will automatically execute. The Tile Conversion Process will retrieve all the text inside the First Tab of the Text Editor. Individual words will be separated and placed into their own tiles. The "space" (the character made when pressing the space bar on the keyboard) will the separator that will determine the separation of words. A flowchart illustrating a conversion of text with the First Tab to the ShuffleZ Mode is shown in FIGS. 22 and 23. FIG. 24 shows a conversion process from ShuffleZ Mode to Editor Mode.

Figure 25:
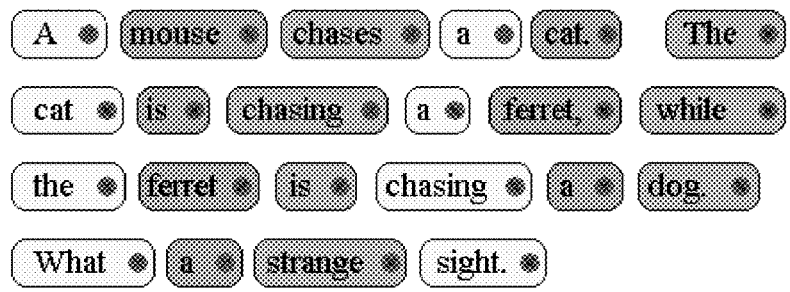
FIGS. 25-36 show a tile interface of an intelligent graphical word processing system according to one embodiment of the present disclosure.
Figure 26:
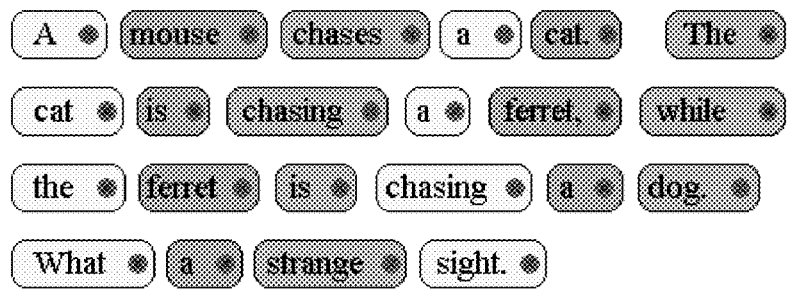

FIG. 25 shows an example of a tile interface using the following sentences: "A mouse chases a cat. The cat is chasing a ferret, while the ferret is chasing a dog. What a strange sight." Those sentences will be separated out into tiles as shown in FIG. 25.

Each word is assigned to its own tile. Also, punctuation is included in the tiles. A color pattern of the tiles can be changed by the user, in the ShuffleZ Mode Settings. Within the tile interface, a user may merge and split the tiles, highlight the tiles, Drag and Drop the tiles, and delete the tiles.

Figure 27:
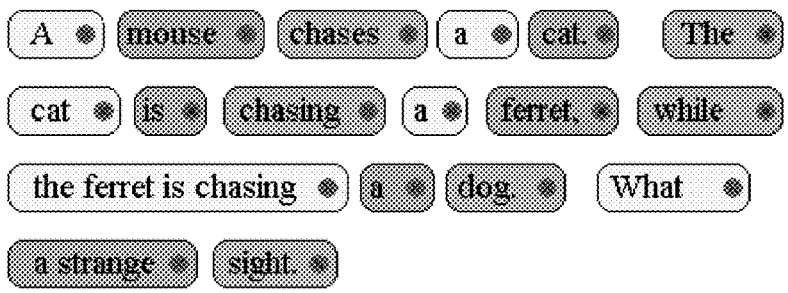

When a user first accesses ShuffleZ Mode, all of the words will be separated into their own tiles. However, the user has the option to merge the tiles. As shown in FIG. 27, the words: "the ferret is chasing" and the words "a strange" are merged together into their own tiles. The tile color pattern may also be adjusted to maintain the appropriate pattern after merging. Merging the tiles may be accomplished by highlighting the tiles and option selecting or using a shortcut key combination to designate a merge.

Splitting tiles is an action that will separate out the words of a merged tile. When a highlighted tile is split, the program will scan the highlighted tile to see if the text in the tile is longer than one word. If there are multiple words, then those words will be separated and placed into their own individual tiles. If there is only one word, then nothing will be done. Multiple tiles can be highlighted at the same time. Multiple highlighted tiles can be split at the same time. Once the Split Action is completed, then the tiles will be ordered and recolored.

Figure 28:
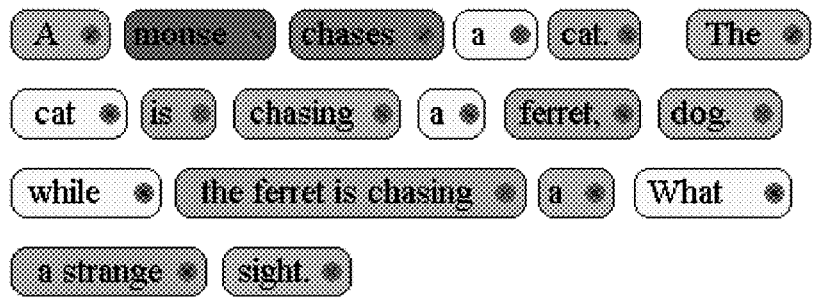
Figure 29:
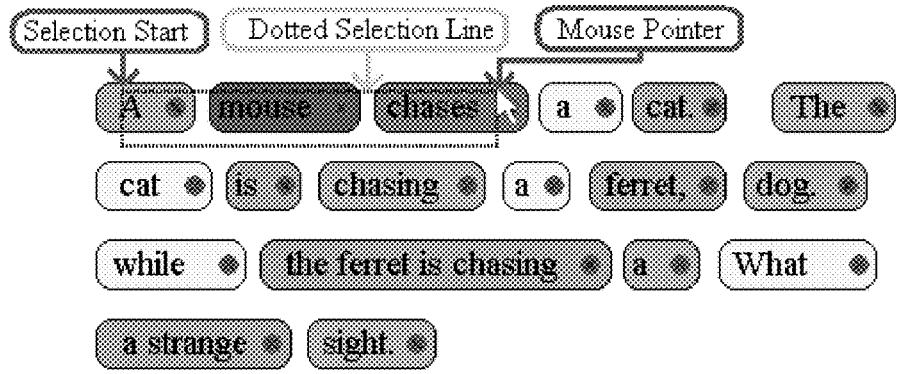

Referring to FIG. 28, a user may highlight various combinations of tiles, and the color of the tile may be adjusted upon selection. A single tile may be highlighted by selecting the tile on a display of the computer system using a user input device (such as a mouse or touchscreen), or by selecting multiple tiles as shown in FIG. 29.

Figure 30:
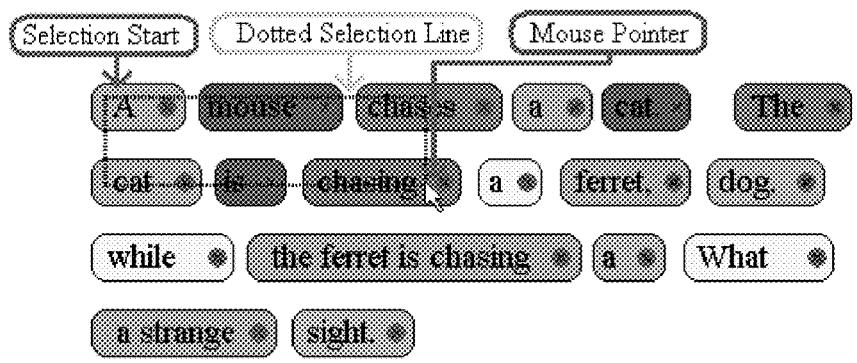

FIG. 30 shows a selection process that starts with the tile "A". Then the user moves the mouse to the right and down, to the tile "chasing." Although, only six tiles are within the Dotted Selection Line, all of the tiles on the top row are selected. When moving a selector down to other rows, all of the tiles of the previous rows should be selected, as well.

Figures 31, 32:
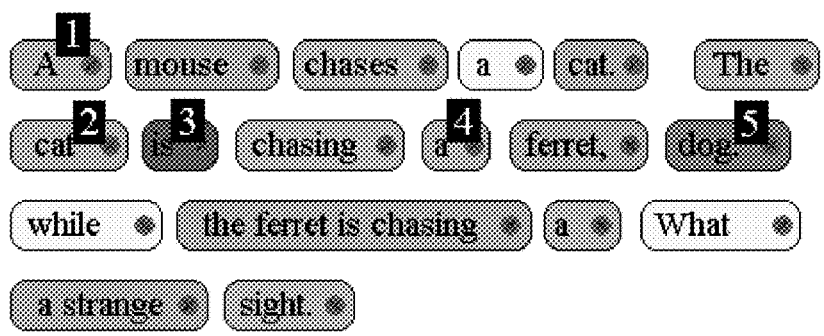

Multiple tiles may also be selected using shift key highlighting, as shown in FIG. 31.

When a merge action of FIG. 31 is executed, as shown in FIG. 32, a new tile with the text of: "A cat is a dog." will be created and put into the location where the tile "A" is. The tile location is determined by which tile was selected first. All other highlighted tiles will be deleted. FIG. 32 illustrates what would be displayed after the user merges the tiles together. All tiles have shifted and have recolored themselves back to the regular color pattern.

In ShuffleZ Mode, a user can Drag and Drop the tiles as desired. Tiles may be dragged and dropped into the ReOrganizer, Trash Can, ScratchPad, or the Category Organizer. However, depending on where the Drag and Drop originates, will determine what will happen.

Drag and Drop from ReOrganizer into Trash Can
   If dragged and dropped into the Trash Can, then the tile will be copied over to the Trash Can. Then the tile in the ReOrganizer will be deleted.
Drag and Drop from ReOrganizer into ScratchPad
   If dragged and dropped into the ScratchPad, then the tile will be copied into the ScratchPad. The tile in the ReOrganizer will remain.
Drag and Drop from ReOrganizer into Category Organizer
   If dragged and dropped into the Category Organizer, then the tile will be copied into the Category Organizer. The tile in the ReOrganizer will remain.
Drag and Drop from Trash Can to anywhere
   If dragged and dropped from the Trash Can, then the tile will be copied over to its new destination. Then the tile in the Trash Can will be deleted.
Drag and Drop from ScratchPad into ReOrganizer
   If dragged and dropped into the ReOrganizer, then the tile will be copied into the ReOrganizer. The tile in the ScratchPad will be deleted.
Drag and Drop from Category Organizer into ReOrganizer
   If dragged and dropped into the ReOrganizer, then the tile will be copied into the ReOrganizer. The tile in the Category Organizer will be remain.
Drag and Drop from the Category Organizer into the ScratchPad or vice versa
   If a tile is dragged and dropped from either the Category Organizer, or the ScratchPad, into the other location, then the tile will simply be copied from one location to the other.

Performing a Drag and Drop will require basic animation of the tiles. When a tile is dragged between two other tiles (known as TC and TD), then the space between the tiles TC and TD will expand. This expansion allows the user to visually see where the tile is going to "drop."

The expansion of the space between the tiles of TC and TD will be calculated based off of the position of the mouse pointer. The tile closest to the right of the mouse pointer will move to the right (this will be the tile named TD). The tile to the closest to the left of the mouse pointer will move to the left (this will be the tile named TC).

Figure 33:
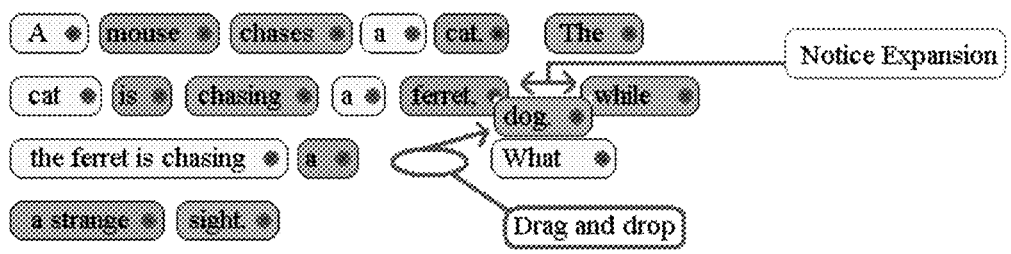

Animation of a Drag and Drop process is shown in FIG. 33. As shown in the figure, the tile of "dog" is being dragged in between the tile of "ferret," and the tile of "while". The "ferret," and "while" tiles are expanding, when the "dog" tile is being hovered over between them.

Figure 34:
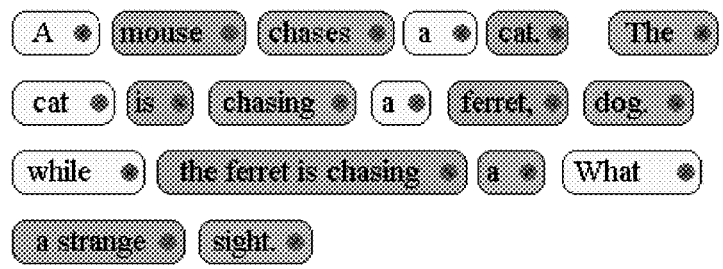

FIG. 34 shows a completed Drag and Drop of FIG. 33, wherein the order of tiles has changed and a color pattern of the tiles is updated.

Figure 35:
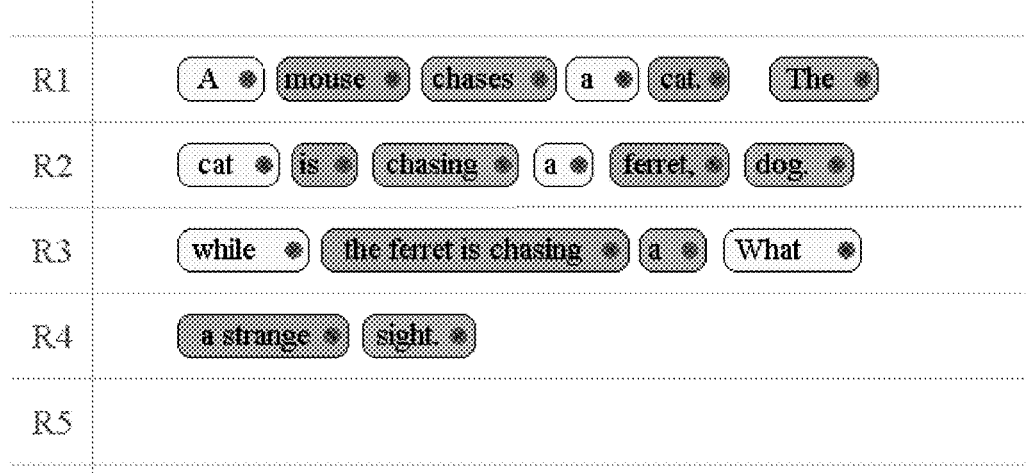

The ReOrganizer may also include rows, row numbers, and lines to distinguish those rows. In FIG. 35, row numbers, in the format of "R<number>", are displayed on the left side of the screen. Each Row is defined by two, very light, straight lines that displays above and below the tiles. There will, also, be a very light line that separates the row number from the tiles. The amount of padding between the tiles and the row lines will depend on what is most aesthetically pleasing.

Figure 36:
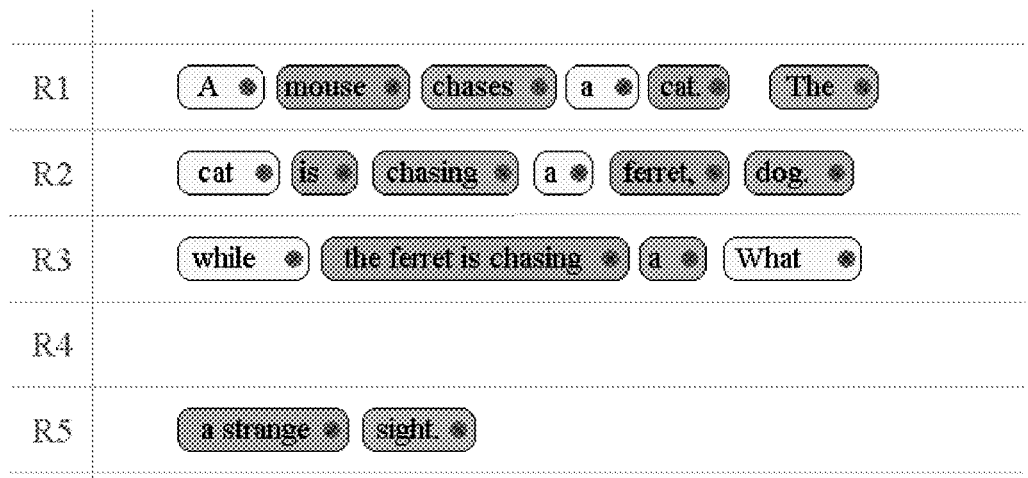

In FIG. 36, R4 is a row with no tiles in it. This is a Blank Row. Blank Rows will be determined during the Tile Conversion Process, and can be created by the user during ShuffleZ Mode. During a Tile Conversion Process, the intelligent graphical word processing system will check to see if there are carriage returns (Hex code: OD). There will be three different possibilities for multiple number of carriage returns: (1) if there is only one carriage return, then a new row will be started, so tiles can be added to it; (2) if there are two carriage returns, then a new blank row will be added; and (3) if there are more than two carriage returns, then there will be a blank row for the first two carriage returns and one new row for each carriage return after that. <Blank Rows>=<# of Carriage Returns>-1.

FIG. 36 shows a visual example of rows according to embodiments of the present disclosure. If a user right clicked on row three (R3) and selected "Add Blank Row Below," then a blank row will be added below R3 and all other tiles will be pushed down.

Referring to FIGS. 37 and 38, the tiles may be implemented with the Category Organizer described above. A Title Row is included, which contains the title and its background color. A Spacer Row is provided after the Title Row. Then you will have all of the text for that title converted into tiles. After the tiles is another Spacer Row. That will repeat for each title, until there are no titles and text left. The Title Rows will not be allowed to have tiles in them. The Spacer Rows cannot have tiles. The Spacer Rows exist for the purpose of spacing out the Titles and tiles so they are not jammed together.

In one embodiment, data entered into the electronic text document by a user is analyzed and information related to that data is provided to advertisers. Companies may market websites and other information through the AI component such that content is pulled from the advertisers into the document created by the user.

The intelligent graphical word processing system and method of the present disclosure allows a user to construct an electronic text document based on inputted terms by the user. The system and method may retrieve additional textual content from the Internet based on the terms entered by the user and enhance the terms inputted by the user using the AI component. Further, the user may subsequently rearrange text elements using a visual tile interface that facilitates placement and reorganization of terms within the electronic text document.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A graphical word processing system for constructing an electronic written document comprising:
   a computing device including a display and a user input device;
   a user-facing application operable to be displayed on the computing device, the user-facing application including
     a text editing area for receiving textual user input from the user input device, the text editing area including at least a first tab and a second tab and
     one or more selectable shortcut buttons displayed on the computing device and selectable by the user;
   an artificial intelligence module for interpreting the textual user input of the first tab, retrieving content from a network based on the textual user input and a browsing history of the user on the computing device, and for displaying content based on the textual user input and retrieved content on the second tab of the user-facing application; and
   a tile module for displaying textual input received in the text editing area of the user-facing application as movable word tiles, the word tiles arrangeable by the user on the user-facing application to create one or more sentences;
   wherein the electronic written document is constructed from sentences created by the movable word tiles as arranged by the user on the user facing application.

2. The graphical word processing system of claim 1, the text editing area further including a third tab, wherein the artificial intelligence module displays hyperlinks corresponding to content retrieved by the artificial intelligence module in the third tab.

3. The graphical word processing system of claim 1, the user-facing application further including a Category Organizer including a category area displaying one or more categories selectable by the user, wherein the movable tiles may be dropped into one or more categories of the Organizer Area by the user.

4. The graphical word processing system of claim 1, wherein each of the movable tiles corresponding to words received in the text editing area includes a selectable trash button, wherein selection of the trash button moves the movable tile to a trash portion of the user-facing application.

5. The graphical word processing system of claim 1, wherein the tile module converts each word within the text editing area into separate movable tiles displayed on the user-facing application.

6. The graphical word processing system of claim 1, wherein the tile module aggregates a plurality of separate movable tiles into individual tiles having multiple words on the tiles based on user selection of the movable tiles on the user-facing application.

7. The graphical word processing system of claim 1, further comprising a trash portion for receiving discarded text.

8. A graphical word processing system for constructing an electronic written document comprising:
   a computing device including a display and a user input device;
   a user-facing application operable to be displayed on the computing device, the user-facing application including
     a text editing area for receiving textual user input from the user input device, the text editing area including at least a first tab and a second tab and
     a selectable shortcut button displayed on the computing device and selectable by the user;
   an artificial intelligence module for interpreting the textual user input of the first tab, retrieving content from a network based on the textual user input and a browsing history of the user on the computing device, and for displaying content based on the textual user input and retrieved content on the second tab of the user-facing application; and
   a tile module for displaying textual input received in the text editing area of the user-facing application as movable word tiles wherein the tile module converts each word within the text editing area into separate movable tiles displayed on the user-facing application, the word tiles arrangeable by the user on the user-facing application to create one or more sentences;
   wherein the electronic written document is constructed from sentences created by the movable word tiles as arranged by the user on the user facing application.

9. The graphical word processing system of claim 8, wherein the tile module aggregates a plurality of separate movable tiles into individual tiles having multiple words on the tiles based on user selection of the movable tiles on the user-facing application.

* * * * *